United States Patent [19]

Thanawalla et al.

[11] Patent Number: 4,722,947

[45] Date of Patent: Feb. 2, 1988

[54] PRODUCTION OF RADIATION CURABLE PARTIAL ESTERS OF ANHYDRIDE-CONTAINING COPOLYMERS

[75] Inventors: Chandrakant B. Thanawalla, Exton; Gary W. Ceska, Paoli, both of Pa.

[73] Assignee: Pony Industries, Inc., New York, N.Y.

[21] Appl. No.: 762,595

[22] Filed: Aug. 5, 1985

[51] Int. Cl.$^4$ .............................................. C08F 8/14
[52] U.S. Cl. .................................. 522/120; 525/309; 526/271
[58] Field of Search .................. 525/303; 522/120

[56] References Cited

U.S. PATENT DOCUMENTS

| | | | |
|---|---|---|---|
| 3,342,787 | 9/1967 | Musket et al. | 260/78.5 |
| 3,380,831 | 4/1968 | Cohen et al. | 96/115 |
| 3,425,977 | 2/1969 | Skoultchi et al. | 525/303 |
| 3,536,461 | 10/1970 | Mueller et al. | 44/62 |
| 3,594,410 | 7/1971 | Cohen et al. | 26/486 R |
| 3,825,430 | 7/1974 | Kurka | 96/115 R |
| 3,840,390 | 10/1974 | Kozu et al. | 525/303 |
| 3,862,067 | 1/1975 | Motier et al. | 260/235 |
| 3,884,856 | 5/1975 | Motier et al. | 260/23 EP |
| 3,912,670 | 10/1975 | Huemmer et al. | 204/159.11 |
| 4,025,548 | 5/1977 | Huemmer et al. | 260/486 B |
| 4,183,796 | 1/1980 | Ansel et al. | 204/159.23 |
| 4,243,500 | 1/1981 | Glennon | 204/159.12 |
| 4,293,636 | 10/1981 | Okuya | 430/281 |
| 4,360,540 | 11/1982 | Chong | 526/298 |
| 4,401,793 | 8/1983 | Chiao et al. | 525/285 |
| 4,404,075 | 9/1983 | Ikeda et al. | 525/531 |

*Primary Examiner*—Joseph L. Schofer
*Assistant Examiner*—Bernard Lipman
*Attorney, Agent, or Firm*—M. S. Jarosz; A. J. Good

[57] ABSTRACT

Radiation-curable low molecular weight partial ester copolymer compositions comprising products of a terminally ethylenically unsaturated compound and a maleic anhydride characterized by having free-anhydride functionality are provided. The partial esters are produced by esterification of certain copolymers under anhydrous conditions with a hydroxyalkyl acrylyl compound, or an admixture thereof with a monohydric alcohol. The compositions of the invention are useful as radiation cross-linkable diluents for radiation-hardenable compositions, particularly in improving adhesion promotion and/or dispersive capabilities of binder resins.

15 Claims, No Drawings

PRODUCTION OF RADIATION CURABLE PARTIAL ESTERS OF ANHYDRIDE-CONTAINING COPOLYMERS

BACKGROUND OF THE INVENTION

1. Field of the Invention

This invention relates to the production of certain copolymer compositions containing free anhydride functionality. These copolymers are low molecular weight esterification products of a terminally ethylenically unsaturated compound and a polymerizable maleic anhydride and are polymerizable or curable by radiation such as ultraviolet, electron beam, and the like. The cured products of these novel compositions provide adhesion to a variety of substrates when present in conventional binder or coating systems and promote dispersion of inorganic compounds such as metal oxides, pigments and the like. Hence, the cured products based on the novel partial esters of the present invention are useful in radiation-curable inks, coatings and adhesives for a variety of substrates, such as paper, plastics, glass, metals and the like.

2. Description of the Prior Art

Irradiation as a method of curing free radical polymerizable compositions has a number of advantages over heat or ambient temperature curing, including: rapid cure at ambient temperatures; elimination of solvents together with the environmental problems associated therewith and the cost of their recovery; elimination of direct use of fossil fuels for curing and their polluting effects; capability of coating heat-sensitive substrates; obtainment of excellent physical and electrical properties of resulting products; and achievement of various cost savings by use of automation and high speed operation and high production. However, radiation curing at times introduces its own difficulties, such as in connection with formulation of compositions having varying degrees of viscosity and flow to permit commercially acceptable radiation curing, use of toxic components, and inhibition of curing by air contact. These difficulties may be substantially overcome by selective formulation of the radiation curable compositions, and hence, the selection of components of radiation curable compositions becomes critical if the advantages of radiation curing are to be realized and desirable useful commercial products obtained.

Radiation-hardenable coating compositions are well known in the art. Monomers typically used heretofore for such purposes include acrylic and methacrylic acid esters of various diols and triols, such as 1,6-hexanediol, diethylene glycol, 1,4-butanediol, trimethylolpropane, pentaerythritol or glycerol, as well as alkoxylated, such as ethoxylated and propoxylated derivatives thereof. Representative of patents directed to radiation polymerizable compositions include U.S. Pats. Nos. 3,594,410 and 3,380,831 concerned with printing and thermal transfer reproduction elements, as well as U.S. Pats. Nos. 3,912,670; 4,025,548; 4,183,796; 4,243,500; 4,360,540; and 4,404,075, all of which are directed to coatings and adhesives. None of these patents disclose the type of monomers upon which the present invention is predicated.

Half esters of styrene maleic acid anhydride copolymers have previously been described in U.S. Pats. Nos. 3,536,461 and 3,342,787 for applications other than radiation curing. Also, electro-coating compositions containing styrene-maleic anhydride copolymers derived from low molecular weight copolymers of styrene and maleic anhydride are disclosed in U.S. Pats. Nos. 3,862,067 and 3,884,856. In addition, esters of such copolymers with unsaturated alcohols are disclosed in U.S. Pat. Nos. 3,825,430, as well as 4,401,793 concerned with production of actinic-light polymerizable esters and as reative thickners in anaerobic compositions, respectively, prepared by reacting an anhydride-containing polymer with an excess of hydroxyalkylacrylate or methacrylate; the esters of these patent disclosures are characterized as being free of unreacted anhydride groups. French Patent Publication No. 2,253,772 is concerned with production of styrene-maleic anhydride polymers which have been esterified by an unsaturated alcohol or by a polyol partially esterified with an unsaturated aliphatic acid so that it contains free hydroxyl groups. Finally, U.S. Pat. No. 4,293,636 relates to photopolymerizable compositions useful for processing printing circuit boards comprising a polyester, a half-esterified hydroxyalkylacrylate of a polybasic acid, vinyl monomer and initiator.

SUMMARY OF THE INVENTION

It has now been found that a certain novel class of low molecular weight partial esters of anhydride-containing copolymers are capable of providing nonaqueous radiation curable compositions without employment of an inert organic solvent component. Hence, such compositions eliminate or minimize several substantial problems of conventional curing, namely pollution and/or toxicity due to solvent, while simultaneously lowering process costs as a result of operation without solvent.

The novel compositions of the invention are esterification products or a terminally ethylenically unsaturated compound and an anhydrous polymerizable anhydride, and are polymerizable and/or curable by radiation such as ultraviolet, electron beam and the like. Such compositions which are curable by radiation provide products which promote adhesion to a variety of substrates, including glass, plastic, paper and metal. In addition, these novel compositions curable by radiation provide products which promote increase in viscosity of the medium it is made a part of. The novel compositions of the invention are characteristically soluble in alkali, but, upon curing, with radiation, provide cured products which are insoluble in alkali. The compositions of the invention , upon radiation curing, yield novel polymers of up to about 100,000 molecular weight which are useful as pour point depressants, lubricants and surfactants.

Accordingly, one aspect of the invention is to provide radiation-hardenable partial esters of free-anhydride containing copolymers which exhibit the aforementioned physical and chemical properties. A further object of the present invention is to provide a new and improved process for the preparation of such partial esters. A still further object of the present invention is to provide radiationhardenable compositions containing radiation curable partial esters of the present invention, which exhibit improved adhesion promotion in connection with the production of useful products such as adhesives, fillers, coatings, as well as resulting cured products and articles.

DETAILED DESCRIPTION OF THE INVENTION

The novel radiation curable compositions of the invention are partial esters of a hydroxyalkyl acrylyl compound, or an admixture of such acrylyl compound and an aliphatic or an aralkyl monohydric alcohol, and a low molecular weight free-anhydride-containing copolymer of a terminally ethylenically unsaturated compound and a polymerizable maleic anhydride.

The radiation curable partial ester copolymer free anhydride-containing compositions of the invention, in general, correspond to the formula:

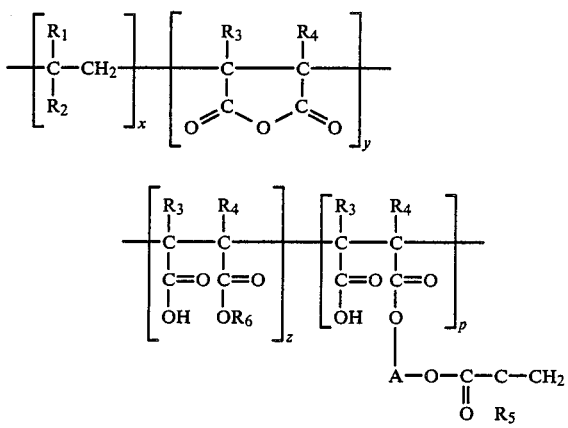

wherein:

$R_1$ and $R_2$ are selected from the group consisting essentially of hydrogen, alkyl containing of from 1 to 20 carbon atoms, aryl containing of from 6 to 10 carbon atoms, alkaryl containing of from 7 to 14 carbon atoms, cycloalkyl containing of from 4 to 12, preferably 4 to 6 carbon atoms, and halogen such as chlorine, fluorine or bromine. $R_1$ and $R_2$ may be the same or different and preferably are each independently hydrogen, methyl, phenyl, benzyl, or cycloalkyl of 4 to 6 carbon atoms.

The radicals $R_3$, $R_4$ and $R_5$ are the same or different radicals and are selected from the group consisting of hydrogen and alkyl of from 1 to 5 carbon atoms, and preferably are each independently hydrogen and/or methyl.

The radical $R_6$ is the same or different radical selected from the group consisting of alkyl, aralkyl, and alkyl substituted aralkyl radicals containing of from 1 to 20 carbon atoms, and oxyalkylated derivatives of such radicals containing of from 2 to 4 carbon atoms in each oxyalkylene group, which group may be of 1 to 20 repeating units, preferably 1 to 6 repeating units; and the radical A is a linear or branched divalent alkylene of from 1 to 20 carbon atoms or an oxyalkylated derivative thereof as described in connection with $R_6$.

Subscripts x, y, z and p are each whole numbers such that the sum of x, y, z, and p may range from 3 to about 20, x, p, and y are each equal to or greater than 1, and z may be 0; preferably, x is equal to 3 to 20, as well as to the sum of y, z and p.

In general, the free anhydride-containing copolymer partial ester compositions of the invention may be liquids or free flowing solids, depending upon their molecular weight, and are characterized by having a number average molecular weight of between about 1,000 and 20,000, preferably between about 2,000 and 4,000, an acid number of at least about 50, preferably between about 100 and 300, an acrylate equivalent per gram value of at least 0.1, preferably of between about 1 and 2, and a glass transition temperature of at least about 40° C. and preferably between about 50° C. and 100° C.

In forming the partial esters of the invention, about 0.1 to 49.9%, preferably about 30 to 45%, of the number of potential carboxyl groups present as acid anhydride groups in the anhydride-containing copolymer reactant are reacted with the hydroxyalkyl acrylyl compound, or admixture thereof with an aliphatic or an aralkyl alcohol. It is critical, in accordance with the invention, that anhydrous copolymer be employed in the esterification reaction and that anydrous conditions be maintained. To attain this end, the esterification reaction is generally carried out in the presence of a solvent of particular attributes to preclude hydrolysis of the anhydride groups. Solvents employable in the esterification reaction are capable of forming an azeotrope with water while being substantially immiscible with water; have a boiling point ranging from between about 100° C. and 150° C., preferably between about 100° C. and 120° C., at ambient pressure; readily dissolve the copolymer, at least at the boiling point of the solvent; and are inert towards reaction with anhydride and mild base, if employed as catalyst. Solvents meeting such attributes are well known in the art, illustrative examples thereof being the cyclic or acyclic dialkyl or arylalkyl ketones such as cyclopentanone, 3-pentene-2-one, 2-pentanone, 3-pentanone, methyl isobutyl ketone and the like; cyclic or acylic dialkyl or aralkyl ethers, such as 1,4-dioxane, 2-chlorethyl vinyl ether, and the like; halogenated alkanes, such as 1,1,2-trichloroethane, chlorobenzene, perchloroethylene, and the like; nitroalkanes such as nitroethane, nitropropane, and the like; and organic esters such as propyl acetate, ethyl carbonate and the like.

The anhydride-containing copolymer employed in preparing the partial ester copolymer compositions of the invention are obtained by any conventional polymerization technique, such as bulk, emulsion, suspension, or solution polymerization. From about 0.5 to about 50 mole %, preferably about 2 to 20 mole %, of an anhydride monomer such as maleic anhydride, or lower alkyl substituted derivatives thereof, containing of from 1 to 5 carbon atoms and mixtures thereof, may be reacted with from about 50 to 99.5 mole %, preferably, from about 70 to about 98 mole %, of at least one ethylenically unsaturated monomer having the formula $CH_2=C(R_1)(R_2)$, wherein $R_1$ and $R_2$ are as above indicated. Illustrative ethylenically unsaturated monomer suitable for reaction with the anhydride monomer include ethylene, propylene, 1-octene, styrene, α-methylstyrene, p-tertiary butyl styrene, vinylcyclohexane, and vinyl chloride.

Especially preferred reactants for preparation of the aforementioned free-anhydride containing copolymers used in the invention are styrene/maleic anhydride copolymers having a mole ratio of styrene to maleic anhydride of about 1:1 to 4:1, preferably 1:1 to 2:1. Such copolymers have a number average molecular weight of between about 500 and 4,000 and preferably from about 1,000 to 3,000, the most preferred range being between about 1,500 and 2,500. These copolymers are commercially available under the tradename SMA ® resins from ARCO Chemical Company, Division of Atlantic Richfield Company. It is critical, in accordance with the invention, that an anhydrous copolymer reactant be employed. Such reactant may be made anhydrous, i.e. any carboxyl groups present as a result of hydrolysis of original anhydride groups present in the copolymer, may be reconstituted to the anhydride state, in conventional manner by removing the water from the copolymer by azeotroping the copolymer with any convenient solvent that readily dissolves the resin. Alternatively, organic solvents which are immiscible in water, illustratively ketones, such as methyl isobutyl ketone, may be employed, as above indicated.

As the hydroxyalkyl acrylyl compound employed for esterification of the free-anhydride containing copolymer, there may be employed a hydroxyalkyl acrylate or a hydroxyalkyl methacrylate, as well as oxyalkylene derivatives thereof containing of from 2 to 4 carbon atoms in each alkylene oxide unit (which may be of 1 to 20 repeating units), which compound corresponds to the formula:

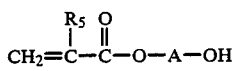

$$CH_2=C-C-O-A-OH$$
with $R_5$ above $C$ and $O$ (double bond) above the second $C$ wherein the radicals $R_5$ and A are as indicated hereinabove. The hydroxyalkyl acrylyl compounds are well known in the art and may be illustrated by hydroxyethyl acrylate, hydroxyethyl methacrylate, hydroxypropyl acrylate, hydroxybutyl methacrylate, tetrapropylene glycol monoacrylate, tetrapropylene glycol monomethacrylate and the like.

Alternatively, an admixture of the aforedescribed acrylyl compound and an aliphatic or an arylalkyl monohydric alcohol, or oxyalkylated derivative of such aliphatic or arylalkyl monohydric alcohol containing of from 2 to 4 carbon atoms in each oxyalkylene group which group may be of 1 to 20 repeating units, preferably 1 to 6 repeating units, may be employed in the esterification of the copolymer Typical illustrative monohydric alcohols employable for such purpose include alkanols such as methanol, ethanol, propanol, cyclohexyl alcohol, benzyl alcohol, alpha-phenethyl alcohol, β-phenethyl alcohol, nonylbenzyl alcohol, as well as oxyalkylene derivatives of such alcohols wherein at least one 1,2-alkylene oxide, such as ethylene oxide, 1,2-propylene oxide, and 1,2-butylene oxide has been condensed therewith.

Although the anhydride-containing copolymer may be first reacted with the hydroxyalkyl acrylate and subsequently with the monohydric alcohol, or alternatively, first reacted with the monohydric alcohol and subsequently reacted with the hydroxyalkyl acrylate, preferred practice of the invention resides in the simultaneous reaction of admixture of the hydroxyalkyl acrylate and monohydric alcohol, thereby forming the desired partial ester of the anhydride-containing copolymer of the invention. When an admixture of the hydroxyalkyl acrylyl compound and monohydric alcohol is employed to esterify the free anhydride-containing copolymer, the molar ratio of monohydric alcohol to hydroxyalkyl acrylyl compound will generally range from between about 1:10 to 10:1, and preferably from between about 1:1 and 1:5.

The esterification reaction is carried out at the reflux temperatures of the reaction admixture, generally at temperatures from of about 50° C. to 150° C. and preferably from about 95° C. to about 120° C. Although a catalyst need not be employed, the esterification reaction is normally effected in the presence of suitable catalyst, such as an alkali metal alkanoate, illustratively, sodium acetate, potassium propionate, and lithium acetate.

To prevent radical polymerization of the resultant partial ester, there may also be included in the esterification reaction a radical-polymerization inhibitor present in amount of about 0.001 to 0.05 wt %, based on the weight of the partial ester. Illustrative inhibitors employable for such purpose include phenols exhibiting steric hindrance such as hydroquinone, hydroquinone monomethyl ether, 2,6-ditertiary butyl p-cresol and the like.

The radiation-hardenable compositions of the present invention may be cured by means of high-energy radiation, such as electron beam, UV light, gamma rays, etc., but preferably by electron beam radiation.

The radiation-hardenable compositions containing the free anhydride-containing copolymer partial ester of the present invention comprise a binder or diluent (oligomer) together with said partial ester. The reactive diluent component of the radiation-hardenable composition comprises one or more free radical polymerizable, radiation curable, substantially nonvolatile, liquid monomers or oligomers of up to about 2000 molecular weight selected from monoethylenically unsaturated materials, polyethlenically unsaturated materials and mixtures thereof. The presence of amounts of polyethylenically unsaturated materials greater than about 5%, by weight, may introduce a degree of crosslinking in the radiation cured products which may render the products too rigid and brittle for some end uses of the present invention. However, in other applications thermosetting properties are desirable for chemical and stain resistance, higher Tg, heat and degradation resistance, and other properties in coatings, pottants, solder resists, sealants, fiber binders, and others. In such cases a polyunsaturated material may comprise a major proportion of the reaction diluent or all of the diluent. For applications in which crystallinity must be minimized, the more suitable reactive diluents thus primarily comprise monoethylenically unsaturated liquids which are radiation polymerizable. Representative types are vinyl monomers such as the lower alkyl esters of acrylic or methacrylic acid including methyl methacrylate, ethyl acrylate, 2-ethylhexyl acrylate, butyl acrylate and isobutyl methacrylate; vinyl esters such as vinyl acetate and vinyl propionate; vinyl halides such as vinyl chloride and vinylidene chloride; and particularly high solvency monomers such as 2,2-ethoxyethoxyethyl acrylate, tetrahydrofurfuryl acrylate, n-laurylacrylate, 2-phenoxyethylacrylate, glycidyl acrylate, glycidyl methacrylate, isodecyl acrylate, isoctyl acrylate, and the like. Other monoethylenically unsaturated reactive diluents include vinyl aromatics such as styrene, alphamethylstyrene, vinyl toluene, indene and p-tert butyl styrene; ethylenically unsaturated acids such as fumaric acid, maleic anhydride and the esters thereof; and nitrogen containing monomers such as acrylonitrile, methacrylonitrile, acrylamide, methacrylamide, N,N-dimethacrylamide, N-vinylpyrrolidine, N-vinylcaprolactam, and the like.

The polyethylenically unsaturated reactive diluents include polyol polyacrylates and polymethacrylates, such as alkane ($C_2-C_{16}$) diol diacrylates, aliphatic ($C_2-C_{16}$) polyacrylates, alkoxylated aliphatic polyacrylates such as described in U.S. Pat. No. 4,382,135, polyether glycol diacrylates and the like. Typical of the foregoing are 1,6-hexanediol diacrylate, neopentyl glycol diacrylate, 1,3-butylene glycol diacrylate, tripropylene glycol diacrylate, polyethylene glycol 200 diacrylate and tetraethylene glycol diacrylate. Other polyunsaturated reactive diluents are allyl acrylates such allylmethacrylate and diallylmethacrylate; acrylated epoxies, aminoplast acrylates and unsaturated polyesters; trimethylol propane based polyacrylates such as trimethylolpropane triacrylate; the pentaerythritol-based polyacrylates or polymethacrylates described in U.S. Pat. No. 4,399,192; acrylic oligomers; acrylated polymer or oil such as acrylated epoxidized drying-type oils, acrylated bisphenol A/epoxy resins, ethoxylated bisphenol A diacrylate, acrylated urethane prepolymers (also know as 'acrylated polyurethanes'), polyethers, silicones, and the like.

The reactive diluents are conventionally sold with a free radical polymerization inhibitor content ranging from about 25 to 2000 ppm. Of course, if the reactive diluents are produced at the site of radiation curing, little or no inhibitor need be present in the diluents.

The foregoing and other reactive diluents (and inhibitors if used) are widely known and are described in the patent and other literature, such as component (1) of U.S. Pat. No. 3,368,900, component (2) of U.S. Pats. Nos. 3,380,831 and 3,594,410, the polymerizable vehicles disclosed in U.S. Pats. Nos. 4,163,809 and 4,481,258, and the acrylated polymer of oils, acrylic oligomers and other radiation curable component (b) compounds disclosed in U.S. Pat. Nos. 4,360,540. All of the aforementioned patents, descriptive of reactive diluents useful in the present invention, are incorporated herein by reference.

In addition to reactivity and desired degree of cross-linkability, the reactive diluents will be selected on the basis of their solvency for the free-anhydride containing copolymer component and their contribution to the viscosity of the resulting solutions. Compositions ranging from sprayable to extrudable character can thus be prepared. Generally, the less polar the reactive diluent the greater the solvency for said copolymer. Solvency and viscosity can be determined conveniently by preparing mixtures over a range of concentrations, noting the clarity and compatibilities, and measuring the viscosities. In those cases where solvency in a single diluent is insufficient, one or more other diluents may be added to optimize compatibility. The higher the molecular weight of the copolymer, the less soluble the copolymer will be in some of the reactive diluents. Accordingly, molecular weight of copolymer must be balanced with the ease with which solutions can be formed and acceptability of the resulting viscosities and properties relative to the end uses of the compositions. If the intended end use is a coating composition, for example, lower copolymer molecular weight, e.g., not over about 30,000, may be required in order to obtain good solvency and low viscosity in a given reactive diluent or mixture of diluents. The formulator of radiation curable compositions is well area of all of the foregoing and other considerations and can make appropriate selections of components of the compositions and proportions by routine experimentation and judgment in order to obtain a desired balance of properties.

An inert solvent may also be added to the curable compositions to provide better flow or wetting and extremely thin films, e.g., less than 0.2 mils. The solvents may be flashed off before irradiation or left in the composition during the cure. Representative inert solvents are ketones such as methylethyl ketone, haloalkanes such as dichloromethane and other industrial solvents. Such solvents containing compositions have been found useful for imparting improved abrasion resistance to film substrates such as acetates, polycarbonate and others.

Depending upon the radiation source and wavelength used in curing the radiation-hardenable compositions, the compositions may also contain a radiation responsive free radical initiator. If the radiation source is high energy, such as electron beam, little or no initiator may be required. If the radiation is lower energy, e.g., ultraviolet light, if the polymerizable composition is other than in the form of a thin film, e.g., a coating, molding or extrudate, or if the composition contains components (e.g., radiation absorbers, inhibitors) which interfere with or block the irradiation, an initiator normally will be used. The amount of initiator, when used, and the irradiation time will be dependent on the type and amounts of radiation curable components in the composition. For example, if the composition contains highly reactive diluents, the quantum and/or time of irradiation may be less. Generally, the sources of irradiation may be electron beams, gamma radiation emitters, carbon arcs, mercury vapor arcs, ultra violet light sources such as phosphors, argon glow lamps and photographic flood lamps; accelerators including Vandergraaf and Betatron linear accelerators, and the like including combinations thereof. High energy irradiation, such as electron beams, is preferred, with or without an initiator, when the curable composition is in a form other than thin film.

Suitable initiators include any radiation responsive free-radical generating compound known in the art for such purpose, such as the UV responsive photoinitiators 2,2-dimethoxy-2-phenyl acetophenone, 2-hydroxy-2-methyl-1-phenyl propan-1-one, benzoin, benzoin methyl ether, diphenyldisulfide, dibenzyldisulfide, benzil, benzophenone, xanthane, and various other acetophenones. Accelerators such as tertiary amines may also be added. If a higher degree of cross-linking is desired, peroxide or azo initiators may also be used, such as benzoyl peroxide, in conjunction with the free radical initiators. The foregoing and other aspects of radiation curing of polymerizable compositions are wellknown and are non-critical to practice of the invention. Further details may be found in technical articles on the subject such as 'Radiation Curing' in the Encyclopedia of Chemical Technoloy, Kirk-Othmer, 3rd Edition, Volume 19, pages 607-624, incorporated herein by reference.

The radiation curable compositions of the invention provide useful products without inclusion of additives conventionally employed with such compositions. For example, a mixture comprised of about 6 parts by weight, of free-anhydride containing copolymer, about 8 parts of a reactive diluent such as trimethylolpropane triacrylate and about 0.64 parts of a photoinitiator can be applied to a suitable substrate and cured by exposure to UV radiation to form a clear, flexible, strongly adherent, tack-free film, thus demonstrating efficacy as an adhesive coating and a film forming material. Nevertheless, additives will improve and/or modify the useful properties of the compositions upon radiation curing to an extent which is surprising and unexpected. For reasons not fully understood, the presence of additives in the radiation curable compositions prior to curing as opposed to blending additives into a cured polymeric composition, further enhances the properties of the composition beyond what might have been anticipated based upon post blending experience. Possibly, the additives in some manner interact with the free anhydride-containing copolymer and/or the reactive diluent, whereas they do not appear to so interact if blended into a radiation cured mixture of copolymer and diluent.

Generally, the additives are non-reactive with the copolymer, i.e., will not copolymerize therewith, and should disperse well in the solution of copolymer in reactive diluent. Preferably, the additives should dissolve in such solution and should not interfere in the dissolving of the copolymer by the reactive diluent. At least 0.5% of additive based on total weight of composition may be used for efficacy.

When the objective is to prepare adhesives, the radiation curable composition will contain at least about 5 wt.% of copolymer, and the types and quantities of copolymer, reactive diluent and additives are selected to obtain an acceptable $T_g$ in the cured product. Since many of the reactive diluents will have a lower $T_g$ than the copolymer, the $T_g$ and thermoplasticity of the cured product can largely be controlled by selection of reactive diluent and amounts thereof. For further enhancement of adhesive properties, or to modify the thermoplasticity provided by the copolymer, one or both of an elastomeric base (preferably non-crystallizable) and a tackifier may be added to the radiation curable mixture of copolymer in reactive diluent. Elastomeric materials are useful for making the cured product more impact resistant and to provide enhanced shear strength, elongation and modulus. Tackifiers are useful for more sharply delineating the liquid and solid phases of the cured composition, to improve adhesion or to improve bonding to different substrates. From about 5 to 50% by weight of either the elastomeric base or of tackifying resin, based on total composition, are useful. If mixtures of elastomer and tackifier are used, the mixtures can vary from about 5 to 50% of either component.

Any elastomeric materials and tackifiers known in the art may be used. Among the elastomeric bases may be mentioned natural rubber and synthetic rubbery materials such as polyisobutylene, polyvinylisobutylether, neoprene, polyvinylbutyral, chlorosulfonated polyethylene, and various copolymers prepared from two or more of butadiene, acrylonitile, styrene, isoprene, and the like. Many other synthetic resins also have elastomeric properties and are useful as elastomeric additives, such as vinyl toluene resins and polyester resins. The elastomers and may be used singly or in admixture.

Suitable tackifying resins include any of the essentially saturated thermoplastic resin polymers known in the art for their tackifying properties, such as rosin esters, hydrogenated esters of rosin, modified rosin esters, esters of polymerized rosin, esters of hydrogenated rosin, hydrocarbon resins, polyalphamethylstryene, alpha pyrene terpene resins, polyalphamethylstyrene, alpha pyrene terpene resin, vinyl toluene/alphamethylstyrene copolymer resins, beta-pinene terpene resins, polycyclic hydrocarbon resins, and the like. The hydrocarbon elastomers are preferred.

When radiation cured in accordance with the invention, the foregoing compositions with or without elastomeric base and/or tackifier, but preferably with such additives, produce high quality pressure sensitive adhesives having excellent lap-shear and other properties.

The copolymers when combined with low reactivity diluents such as the mono acrylates or methacrylates, will form, upon radiation curing, heat-sealable films having a melting range characteristic of polyvinyl aromatics, e.g., polystyrene. The films can be self-supporting or can be supported on any surface to which they will adhere, e.g., paper or other fibrous material, wood, particle board, plastic sheets of other films, and the like. They can also be used to bond one or more layers in multi-layered systems or laminates. For example, one side of a sheet of paper may be printed with a desired pattern and given a clear top coat, and the other side coated with a film-forming composition of the invention, the entire system then being cured by irradiation. This composite can then be heat-laminated onto rigid, semi-rigid or flexible substrates such as wood, particle board, metal or other films, with the films in contact with the substrate, to form a decorative surface or article. Cured, unsupported films can similarly be heat-sealed to various substrates.

Radiation curable compositions of the invention will form heat-sealable films so long as they remain thermoplastic upon radiation cure. To insure thermoplasticity, no more than 10 wt. % of the reactive diluent, based on total radiation curable composition, should comprise polyethylenically unsaturated material, and preferably no more than about 5 wt. %. It may be desirable in some cases to add an elastomeric material and/or a tackifier to the film-forming composition prior to curing. As in the case of adhesives, films of the compositions can be radiation cured with a variety of radiation sources. High energy sources, such as electron beam, will require no free radical initiator in the composition. Lower energy sources, such as UV, will require an initiator, such as a photoinitiator in the case of UV-curing.

The films will be essentially tack-free, thus further enhancing their utility as heatsealable films. Tack-free quality is achievable in compositions containing tackifier and/or elastomer by careful selection of the type and amount of additive.

The films are formed, bonded to various substrates or laminated using processing techniques and conditions well-known in the adhesives and films industries.

The low-shrinkage characteristic of the radiation cured products produced from the polymerizable compositions of the invention makes them suitable as embedding compositions in various industries to the extent that radiation can penetrate and thereby cure the compositions. Specifically the compositions are useful in the electrical and electronics fields for the encasement of electrical and electronic circuity and parts, and as fillers for dental use and the production of decorative or functional objects such as statuary, cast parts, and the like. "Embedding" as used herein generically includes casting (pouring a hardenable liquid into a mold containing a part to be embedded and removing the mold after hardening), potting (same as coating except the mold remains as an integral part of the hardening unit), impregnating (immersion of a part so that the hardenable liquid fills the interstices of the part), encapsulating (thickly coating a part with a hardenable liquid), and transfer molding (transfer of hardenable liquid under pressure into a mold containing the part to be embedded). Since the hardenable liquid (the radiation curable composition of the present invention) must be radiation cured in a form other than a thin film, either high energy irradiation (such as electron beam) is necessary for curing or the composition must contain a fairly low concentration (about 0.1–10 wt. % on total formulation) of photoinitiator if UV light is used for curing.

Viscosity of the curable compositions is also an important consideration. The viscosity must be sufficiently low so that the composition will flow completely around the part to be embedded at processing temperature and pressure in the case of casting, potting and transfer molding. The viscosity should be even lower in the case of impregnating, but higher viscosity (along with thixotrophy) is necessary for encapsulating to avoid run-off during cure.

Usually the radiation curable composition for such applications will contain sufficient polyethylenically unsaturated reactive diluent for substantial crosslinking during the cure; however, useful products which remain totally thermoplastic but hard are also producible.

As fillers the radiation curable compositions can be used in polymer concrete, adhesives, sealants and bonding agents of all types; and can be admixed with silicate or fiberglass fillers, pigments, adhesion promoters, and flow control agents and a variety of other materials commonly employed in the manufacture of decorative articles, construction materials such as glazing, fiberboard and siding, embedded electronic and electronmechanical assemblies, and a host of other products.

Typically in the foregoing applications a base composition of about 10-75 wt. % of macromonomer in reactive diluent is first prepared and to this composition is added any other materials for obtaining the end use products desired. Alternatively, the base composition can be blended into another composition as a filler.

In radiation curable coatings, such as paints, lacquers and varnishes, the radiation curable compositions of the invention may be present as the major constitutent, such as replacement for the oligomer in oligomer coatings, or may be present as an additive for improvement of certain properties, such as adhesion promotion in oligomer coatings. In the former application the copolymer may amount to about 20-70 and the reactive diluent about 30-80 wt. %, based on total composition, the balance being flow promoters (wetting agents), pigment, coupling agents, slip agents, thixotropic agents, or other modifiers conventionally present in oligomer coatings. In the latter application, preferred ranges are about 2-10 wt. % of macromonomer the balance being reactive diluents, oligomer and additives. The oligomer component of the coating compositions may comprise any of the base materials or bodying agents known for use in nonaqueous, radiation curable coatings. These include polyesters such as the polyethylene polyurethanes of U.S. Pat. No. 4,183,796, the acrylic acid adducts of epoxidized phenolformaldehyde adducts, acrylic acid adducts of the diglycidyl ether or bisphenol A, acrylic acid adducts of soybean oil, the monohydroxy vinyl compound-epoxy adducts of U.S. Pat. No. 4,025,548 wherein the vinyl compound may be a vinyl, allylic, acrylic or methacrylic material, crosslinkable oils and oligomers such as are described in U.S. Pat. No. 3,912,670, and reaction products of 1-alkenes and acrylic derivatives such as described in U.S. Pat. No. 4,009,195.

The coatings may be applied by any suitable means, such as spraying, dipping, flow coating, brushing, and the like, followed by or simultaneously with irradiation.

Radiation curable compositions of the invention may also be formulated for extrusion coating of various substrates and articles such as wire, cables and coils. In these as well as in other coating applications, viscosity control and flow is important; consequently it may be desirable to add a flow control agent (also known as wetting dispersant or spreading agents) to the composition. Representative flow control agents particularly for extrusion applications, are cellulose acetate butyrate polymers, styrene-allyl alcohol copolymers, polyvinylbutyrals and polyvinylethers such as the "Gantrez" maleic anydride copolymer resins sold by GAF Corporation. The radiation curing conditions can be selected for the specific system in accordance with criteria well known in the art. In these applications, for example, electron beam irradiation and three-dimensional curing are often used, due to the greater thickness of material to be cured.

The following examples will serve to illustrate the invention, but it is understood that these examples as well as other embodiments set forth in the specification are merely representative of the invention and do not necessarily limit the scope thereof. In the examples and throughout the specification and claims, all parts and percentages are by weight unless otherwise expressly stated.

EXAMPLE 1

Into a reaction vessel equipped with an agitator, an air inlet tube and a condenser, there was charged 300 parts of anhydrous styrene-maleic anhydride copolymer having a number average molecular weight of about 1,600 and an acid number of 480, 85.5 parts of 2-hydroxyethyl acrylate, 12.7 parts of methanol, 1.2 parts of lithium acetate, 0.17 parts of hydroquinone, and 600 parts of methyl ethyl ketone solvent. Air was greatly sparged through the reaction mixture while heating at reflux and collecting water of esterification for a period of about 10 hours, i.e. until the infra-red spectrum of the reaction mixture showed no more reduction in the intensity of the anhydride absorption. Following the reflux period indicated, the reaction mixture was poured into heptane, thereby causing precipitation of a fine solid, and filtered to provide a free-flowing solid as a reaction product. Following drying, 400 parts of desired free-anhydride-containing copolymer product conforming to the formula:

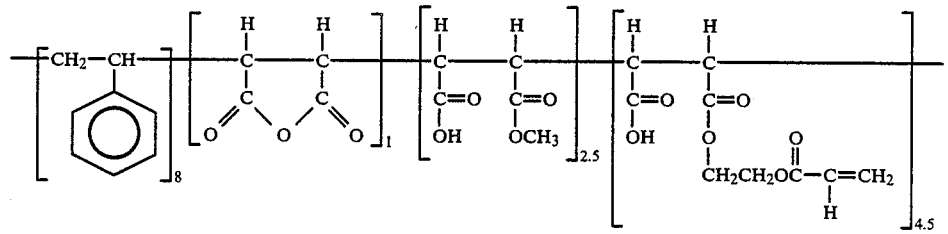

was obtained, The product had an acid number of 194 and an acrylate equivalent of 1.84 meg. per gram.

EXAMPLE 2

A radiation curable free anhydride-containing copolymer was prepared while employing the procedure of Example, 1, except that the following reactants were employed in the quantities indicated:
Anhydrous styrene maleic anhydride copolymer as described—300 parts
2—hydroxyethyl methacrylate—25.4 parts
lauryl alcohol—9.7 parts
lithium acetate—1.2 parts anhydrous styrene maleic anhydride copolymer having a molecular weight of about 1900 and acid number of 275—828.5 parts
4hydroxy butyl acrylate—207.4 parts
ethylene glycol monobutyl ether—42.5 parts
lithium acetate—1.2 parts
hydroquinone—0.17 parts
methyl ethyl ketone—600 parts Following drying, 1,080 parts of the desired free-anhydride-containing copolymer product conforming to the formula:

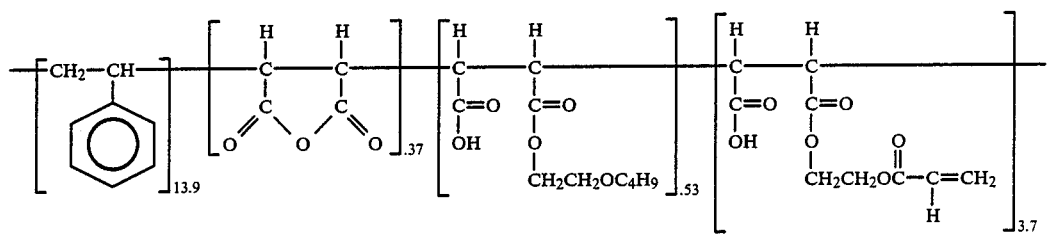

hydroquinone—0.7 parts
methyl ethyl ketone—600 parts

Following drying, 346 parts of the desired free-anhydride-containing copolymer products conforming to the formula:

was obtained. The product had an acid number of 114 and an acrylate equivalent of 1.34 meq. per gram.

In order to evaluate the free-anhydride containing copolymer compositions of the invention, typical radiation curable formulations containing the free-anydride-

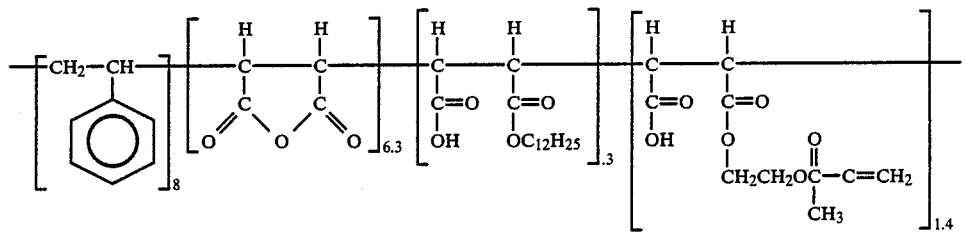

was obtained. The product had an acid number of 380 and a methacrylate equivalent of 0.58 meq. per gram.

EXAMPLE 3

A radiation curable free anhydride containing copolymer was prepared while employing the procedure of Example 1, except that the following reactants were employed in the quantities indicated:

containing copolymer product of Example 1 (with varying amounts of 2-hydroxyethyl acrylate) were formulated and cured as two mil thick, free films, which were then tested for adhesion, pencil hardness, and reverse impact, in accordance with established A.S.T.M. procedures. The results of these evaluation are set forth in Table I below:

TABLE I

| FORMULATION | PARTS BY WEIGHT | | | | | | | |
|---|---|---|---|---|---|---|---|---|
| | A | B | C | D | E | F | G | H |
| SMA Acrylate[1] | 6 | 4 | — | — | — | — | — | — |
| SMA Acrylate[2] | — | — | 6 | 4 | — | — | — | — |
| SMA Acrylate[3] | — | — | — | — | 6 | 4 | — | — |
| Urethane Acrylate[4] | — | — | — | — | — | — | 6 | 4 |
| Carbitol Acrylate[5] | 4 | 2 | 4 | 2 | 4 | 2 | 4 | 2 |
| Trimethylolpropane Triacrylate[6] | 8 | — | 8 | — | 8 | — | 8 | — |
| Darocure ® 1173 Photoinitiator[7] | 0.64 | 0.4 | 0.64 | 0.4 | 0.64 | 0.4 | 0.64 | 0.4 |
| 1,6-Hexanediol Diacrylate[8] | — | 4 | — | 4 | — | 4 | — | 4 |
| FILM PREPARATION & PROPERTIES[13] | | | | | | | | |
| Substrate | ←BONDERITE STEEL→ | | | | | | | |
| Cure Speed[9] | 30 × 1 | 30 × 1 | 30 × 2 | 30 × 1 | 30 × 1 | 30 × 1 | 30 × 1 | 30 × 1 |
| Wet Thickness (mils) | 0.4 | 0.4 | 0.4 | 0.4 | 0.4 | 0.4 | 0.4 | 0.4 |
| Adhesion[10] - UV cure only | 5 | 1 | 5 | 2 | 5 | 3 | 0 | 0 |
| Hardness[11] (pencil) - UV | 5H | 5H | 5H | 5H | 5H | 5H | 5H | 6H |

TABLE I-continued

| FORMULATION | PARTS BY WEIGHT | | | | | | | |
| --- | --- | --- | --- | --- | --- | --- | --- | --- |
| | A | B | C | D | E | F | G | H |
| Reverse Impact[12] UV cure only | 0–2 | 6–8 | 0–2 | 4–6 | 0–2 | 2–4 | 18–20 | 50+ |

FOOTNOTES:
[1]Styrene-maleic anhydride reaction product with 15% hydroxyethyl acrylate and 30% methanol
[2]Styrene-maleic anhydride reaction product with 30% hydroxyethyl acrylate and 30% methanol
[3]Styrene-maleic anhydride reaction product with 60% hydroxyethyl acrylate and 30% methanol
[4]Aliphatic urethane acrylate ester available from the Sartomer Company as ChemLink TM 9004 oligomer
[5]2(2-ethoxy-ethoxy)ethylacrylate available from the Sartomer Company as SR-256
[6]available from the Sartomer Company as SR-351
[7]available from EM Chemicals
[8]available from Sartomer Company as SR-238
[9]using 2 × 300 watt/In Hg Lamps, cure speed of 30 × 2 equals 1.7 Joules/centimeters$^2$
[10]ASTM D 335078
[11]ASTM D 3363-74
[12]ASTM 2294-74
[13]adhesion, pencil hardness and reverse impact properties obtained on cured coatings following at least 16 hours ageing or conditioning As is apparent from the results set forth in Table I, all of the radiation-hardenable compositions containing the copolymer of the invention resulted in the highest value in the adhesion test, in contradistinction to the radiation-hardenable composition containing the urethane acrylate which shows no adhesion capabilities. Although the radiation hardenable composition containing the urethane acrylate appeared superior in reverse impact testing, which is a measure of the flexibility of the coating, all of the radiation hardenable compositions tested were essentially equivalent in pencil hardness.

In summary, it will be apparent to those skilled in the art that numerous modifications may be made in the various embodiments of the invention described above without departing from the spirit or scope of the invention. Thus, various auxillary materials may be added to the radiation curable compositions, such as rheology control agents (e.g. silica gel or other thickener filler), antioxidants, color stabilizers, dyes, pigments and other colorants, flattening agents, radiopaquing agents, impact modifiers, and the like. As coatings, adhesives and films the compositions can be used as paints, varnishes, lacquers, co-elastomers with other elastomers, sealants, binders or impregnating agents for wood, paper and other fibrous materials, solder resists, and as protective coatings or interlayers for glass, transformer coils and metals or films of all kinds. Moreover, the compositions before or after radiation curing can be topcoated with organic solvent based coatings or water-based coatings, and can be applied as prime coats, base coats or single coat systems. The compositions can also be used in printing plates, imaging materials, magnetic media, and in embossing materials and processes. Lastly, as embedding and casting materials, the compositions may be tailored to meet the requirements of various industries such as dentistry, the medical arts and electronics.

What is claimed is:

1. A radiation-curable partial ester of a free anhydride-containing copolymer corresponding to the structural formula:

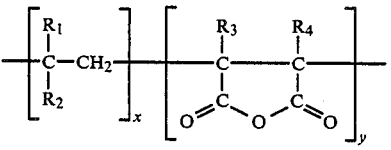

-continued

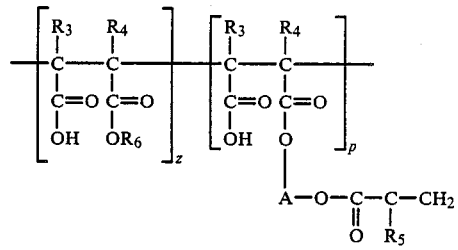

wherein: $R_1$ and $R_2$ are each independently selected from the group consisting of hydrogen, alkyl containing of from 1 to 20 carbon atoms, aryl containing of from 6 to 10 carbon atoms, alkaryl containing of from 7 to 14 carbon atoms, cycloalkyl containing of from 4 to 12 carbon atoms, and a halo radical; $R_3$, $R_4$ and $R_5$ are each independently selected from the group consisting of hydrogen, and an alkyl radical containing of from 1 to 5 carbon atoms; the radical $R_6$ is a member selected from the group consisting of an alkyl, arylalkyl, alkyl-substituted arylalkyl and oxyalkylated derivatives of each of such radicals containing of from 2 to 4 carbon atoms in each oxyalkylene group, which group may be of 1 to 20 repeating units; the radical A is a linear or branched divalent alkylene of from 1 to 20 carbon atoms, or an oxyalkylated derivative thereof containing of from 2 to 4 carbon atoms in each oxyalkylene group, which group may be of 1 to 20 repeating units, and subscripts x, y, z and p are each whole numbers such that the sum of x, y, z, and p may range from 3 to about 20, with x, p and y each being equal to or greater than 1, and z may be 0, said partial ester being characterized as exhibiting a number average molecular weight of between about 1,000 and 20,000, an acid number of at least about 40, and an acrylate equivalent per gram value of at least about 0.1.

2. The partial ester of claim 1 wherein, in said formula, $R_1$ and $R_2$ are each independently selected from the group consisting of hydrogen, methyl, phenyl, and benzyl, and $R_3$, $R_4$ and $R_5$ are each independently selected from the group consisting of hydrogen and methyl; $R_6$ is an alkyl radical containing of from 1 to 6 carbon atoms; A is an alkylene hydrocarbon chain containing of from 2 to 4 carbon atoms.

3. The partial ester of claim 2 wherein, in said formula, the subscript z is 0.

4. The partial ester of claim 1 wherein, in said formula, $R_1$ is hydrogen; $R_2$ is phenyl; $R_3$, $R_4$ and $R^5$ are hydrogen; $R_6$ is methyl and A is an alkylene hydrocarbon chain containing 2 carbon atoms.

5. The partial ester of claim 1 wherein, in said formula, $R_1$ is hydrogen; $R_2$ is phenyl; $R_3$ and $R_4$ are each hydrogen; $R_5$ is methyl; $R_6$ is lauryl; A is an alkylene hydrocarbon chain containing 2 carbon atoms.

6. The partial ester of claim 1 wherein, in said formula, $R_1$ is hydrogen; $R_2$ is phenyl; $R_3$, $R_4$ and $R_5$ are each hydrogen; $R_6$ is the residue of ethylene glycol butyl ether.

7. A radiation curable composition comprising an admixture of:
(i) a radiation curable partial ester of a free-anhydride-containing copolymer corresponding to the structural formula set forth in claim 1, present in an amount of between about 5% and 80% by weight;
(ii) about 20% to 95% by weight, of a free radical polymerizable reactive diluent; and
(iii) and from about 0 to about 10% by weight, of a radiation responsive free radical initiator.

8. The composition of claim 7 wherein said copolymer corresponds to the structural formula set forth in claim 2.

9. The composition of claim 7 wherein said copolymer corresponds to the structural formula set forth in claim 3.

10. A polymerization process comprising subjecting the composition admixture of claim 7 to actinic radiation.

11. A polymerization process comprising subjecting the composition admixture of claim 8 to actinic radiation.

12. A polymerization process comprising subjecting the composition admixture of claim 9 to actinic radiation.

13. The polymeric product prepared by the process of claim 10.

14. The polymeric product prepared by the process of claim 11.

15. The polymeric product prepared by the process of claim 12.

* * * * *